(12) United States Patent
Feehrer

(10) Patent No.: US 8,839,268 B2
(45) Date of Patent: Sep. 16, 2014

(54) METHOD AND SYSTEM OF PREVENTING SILENT DATA CORRUPTION

(75) Inventor: John R. Feehrer, Westford, MA (US)

(73) Assignee: Oracle America, Inc., Redwood City, CA (US)

( * ) Notice: Subject to any disclaimer, the term of this patent is extended or adjusted under 35 U.S.C. 154(b) by 1536 days.

(21) Appl. No.: 12/027,549

(22) Filed: Feb. 7, 2008

(65) Prior Publication Data

US 2009/0204974 A1  Aug. 13, 2009

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06K 7/00 | (2006.01) |
| G06K 7/10 | (2006.01) |

(52) U.S. Cl.
CPC .......... *G06K 7/0008* (2013.01); *G06K 7/10039* (2013.01)

USPC .......................................................... 719/314

(58) Field of Classification Search
USPC .......................................................... 719/314
See application file for complete search history.

(56) References Cited

U.S. PATENT DOCUMENTS

| | | | | |
|---|---|---|---|---|
| 5,799,012 | A * | 8/1998 | Ayerst et al. .................. | 370/336 |
| 2005/0044194 | A1 * | 2/2005 | Baldiga et al. ................ | 709/223 |
| 2006/0242354 | A1 * | 10/2006 | Johnsen et al. ................ | 710/316 |
| 2007/0237157 | A1 * | 10/2007 | Frank et al. .............. | 370/395.52 |
| 2008/0075036 | A1 * | 3/2008 | Bertrand et al. .............. | 370/328 |
| 2009/0113430 | A1 * | 4/2009 | Riley ............................ | 718/101 |

* cited by examiner

*Primary Examiner* — Andy Ho
*Assistant Examiner* — Timothy A Mudrick
(74) *Attorney, Agent, or Firm* — Brooks Kushman P.C.

(57) ABSTRACT

A method and system of avoiding silent data corruption in a request-response messaging system where a requester relies on tags to match request messages with response messages. The silent data corruption occurring if the requester process a response message after a tag used with the response message was reused with another request message.

18 Claims, 2 Drawing Sheets

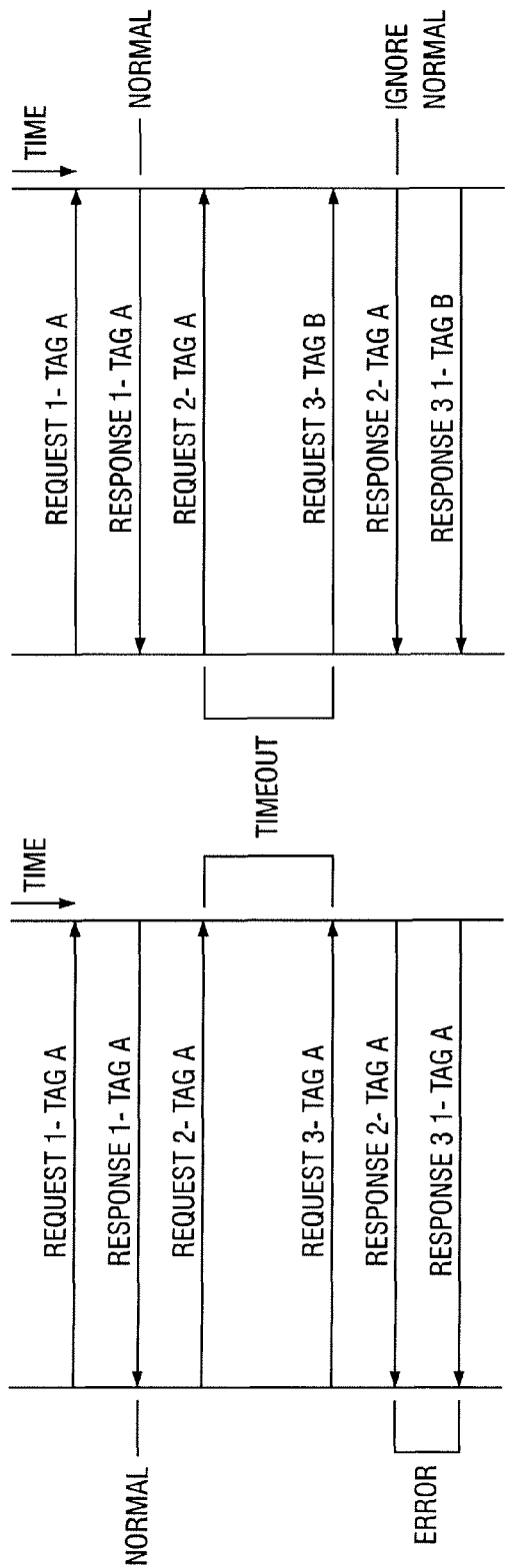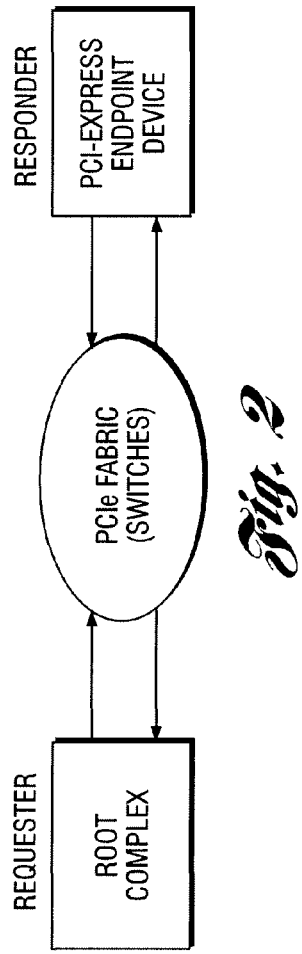

METHOD AND SYSTEM OF PREVENTING SILENT DATA CORRUPTION

BACKGROUND OF THE INVENTION

1. Field of the Invention

The present invention relates to request-response messaging systems of the type where tags are used to match request messages with response messages.

2. Background Art

Peripheral Component Interconnect Express (PCIe) is one of many response-request messaging standards used to facilitate communications between computer components and other entities. The present invention applies to this and other response-request messaging systems where tags are used to provide a matching mechanism to match request messages with their corresponding response message. A tag is any identifier attached or otherwise associated with response/request messages that facilitates tracking the messages and distinguishing one message from another.

PCIe and other tag-based messaging systems generate a number of tags and arrange them into a pool. An unused tag is selected from the pool when required to identify a response-request messaging communication for a particular transaction. During proper operation, the request message is issued with a selected one of the pooled tags and a response having the same tag is eventually received in response. The tag can be re-used in a subsequent request once it the response associate with the previous request is received. In some cases, a timer may be used to monitor a period of time extending from issuance of the request to receipt of the response. If this period of time surpasses a threshold-period, the request may be timed-out and the associated tag may be reused in another request.

The reuse of the tag, however, can be problematic if the long awaited response is received after issuance of another request with the same tag and a requester processes the overdue response as if it was a proper response to the more recent request issued with the same tag. FIG. 1 illustrates this type of error where a response arrives after issuing another request with the same tag.

During normal operation, a request 1 issues with a tag A selected from a pool of tags in anticipation of receiving a response 1 with the matching tag A. A subsequent request 2 can reuse the tag A once the request 1 is received. If a timeout period elapses prior to receiving the response 2, another request 3 may issue with the same tag A. The error, commonly referred to as a ghost completion, occurs when the response 2 to the previous request 2 arrives after the request 3 issues with the reused tag A.

The processing of the wrong response as if it were the right response can lead to ghost completion and silent data corruption issues. PCIe and other response-request messaging systems may experience these issues, whether due to their reliance one the described timeout-based tag reuse strategy or some other strategy.

BRIEF DESCRIPTION OF THE DRAWINGS

FIG. 1 illustrates a response-request messaging system and a timing scheme where errors occur if a response is received after a tag is reused;

FIG. 2 illustrates a response-request messaging system in accordance with one non-limiting aspect of the present invention;

FIG. 3 illustrates the response-request messaging system of the present invention as configured to prevent errors associated with tag reuse.

DETAILED DESCRIPTION OF THE PREFERRED EMBODIMENT(S)

Figure 4:
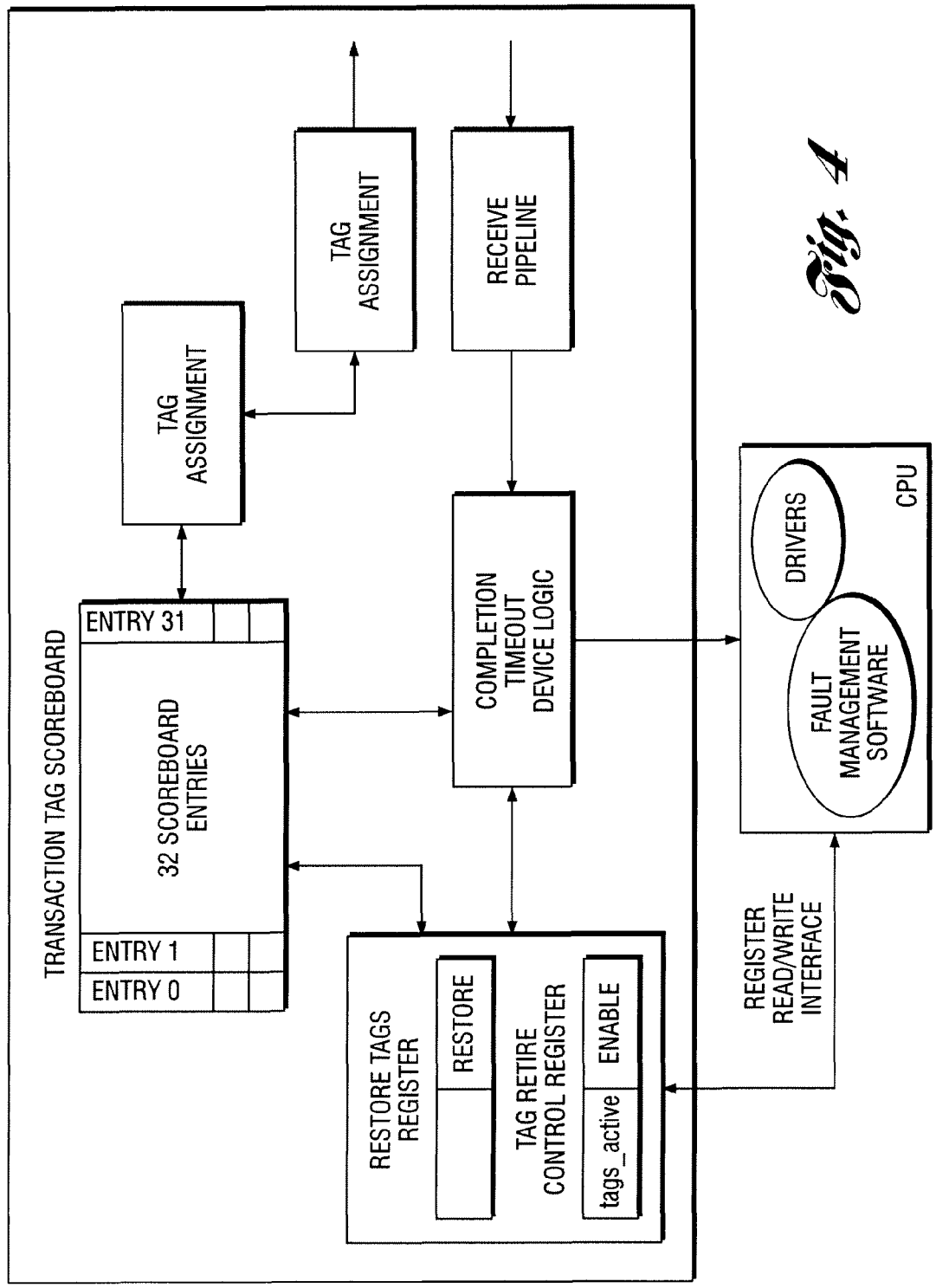
FIG. 4 illustrates an architecture configure to support response-request messaging in accordance with one non-limiting aspect of the present invention.

FIG. 2 illustrates a response-request messaging system in accordance with one non-limiting aspect of the present invention. The system is described for exemplary purposes as a PCIe based system having a requester, which may be a root complex or other feature similarly configured to interface with a processor (not shown) or other element, that issues request messages over a PCIe fabric, which may include a number of switches or other elements, having capabilities sufficient to communicate the messages to a responder or other PCIe endpoint device.

The responder may process the request and issue a responsive request message to the requestor. The requester may be configured to assign tags to each request message and to match the response messages based on the assigned tags. This tag-based messaging arrangement may be defined according to the messaging requirements set forth in the PCIe standards. The present invention may also provide a solution to the above-described ghost completion issues attendant to PCIe and other tag-based request-response messaging systems where errors occur when responses are received and processed after another request reuses the same tag.

FIG. 3 illustrates the response-request messaging system of the present invention as configured to prevent errors associated with tag reuse. The requester may be configured to issue a request 1 with a tag A selected from a pool of tags. If the corresponding response 1 is received before being timed-out, the same tag A may be used with a subsequent request 2. Unlike the system shown in FIG. 1, if no response to the request 2 is received before a timeout period elapses, the requester prevents reuse of the tag A, requiring the next request 3 to issue with a different tag B.

This prevents the ghost completion error since it prevents reuse of the same tag with two outstanding requests. If the requestor subsequently receives the response 2 after the timeout period, regardless of whether the requester receives it before or after the response 3, the present invention contemplates any number of processing options. One option may be for the requestor to simply ignore the response 2. (The requester is shown to ignore the response 2 since the present invention contemplates the requester issuing a new request to accommodate for the information missing from the timed-out request 2.) Another option contemplates the requester monitoring the tags used with each request message and allowing the matching responses 2 to be processed if the same tag A has not been used or was used with the re-issuance of the same request, i.e., if a timed-out request is re-issued, it may be acceptable to process the timed-out response as if it were the true response to the re-issued request.

Once the tags are removed from the pool or otherwise prevented from reuse, the number of available tags available to the requestor is reduced. PCIe and other standards may make a finite number of tags available, which can be problematic if some of the tags are prevented from reuse as contemplated by the present invention since the requestor may experience failure or other issues if an insufficient number of tags are available to support its messaging requirements. The present invention contemplates overcoming this issue by making available some of the tags previously prevented from reuse.

One strategy to reuse the tags previously prevented from reuse may include making a certain number of the tags available if the number of tags in the pool drops below a predefined threshold. The number of tags being made available may be continuously increased/decreased so that some minimum numbers of tags are continuously available within the pool. A first-used-first-reused strategy may be implemented where the tags prevented from reuse are once again allowed to be used based on an order by which the tags were previously used, i.e., the older tags are used before the newer tags.

The present invention provides a configuration that overcomes ghost completions and other types of silent data corruption by preventing reuse of the tags if the tags are associated with timed-out messages. Some standards, like PCIe, fail to address this problem and fail to provide its solution. The period of time selected to determine the timeout period may vary from one standard to another or from one request to another, i.e., more critical requests may be provided with a longer period of time and/or requests having traditionally slower response times, such as due to larger fabric delays, may be provided with longer periods of time.

The use of the timeout period to judge whether a request has become unresponsive is not intended to limit the scope and contemplation of the present invention. The present invention fully contemplates the use and reliance on any other criteria or type of mechanism to judge whether the tag associated with an outstanding request should be removed from a pool of available tags on the chance that a response to the tag could be received after the tag is reused with another request.

One strategy to judge message timeout without relying on the time-based factor may include monitoring historical performance of the fabric and determining a timed-out response based on the congestion of the fabric and whether historical performance indicates the response ever being received or being received within a desired period of time. This decision-making may be made immediately after issuing a request, and without waiting for the above-described timeout period to elapse, so that the corresponding tags can be immediately prevented from reuse. This may be helpful is spreading out processing requirements if the request is required to issue large quantities of request message within a small period of time and/or to speed implementation of one of the reuse used to allow usage of tags prevented from reuse.

FIG. 4 illustrates an architecture for a root complex contemplated to prevent tag reuse errors in accordance with one non-limiting aspect of the present invention. The architecture separates the root complex into a number of logically partitioned elements. These elements may include a transaction tag scoreboard, tag assignment element, pipeline transmit element, pipeline receive element, completion timeout detect element, restore tags register, and tag retire control register. These elements may communicate with a central processing unit (CPU) having fault management software and support drivers.

The tag assignment element may be configured to select one of the available tags from the transaction tag scoreboard when tags are needed for assignment to an outgoing request message. The transaction tag scoreboard is shown to include 32 available tags when all the tags are available (the scoreboard may include any number of tags). An entry associated with each of the tags in the scoreboard may be set to a bit value of 0 if the tag is available and a bit value of 1 is the tag is unavailable. The transmit pipeline element may associate the selected tags for transmission with the request messages.

Response messages to the request messages may be received with the receive pipeline element for assessment with the completion timeout detect logic. If the tag included within the response has not lapsed, the response message may be forwarded to the CPU for processing and the scoreboard may be adjusted to make the associated tag available once again.

If the response is received after the timeout period or no response is received within the timeout period or its is otherwise judged as unresponsive, the completion timeout detect logic may communicate a message to the CPU indicating the failure. The CPU may take corrective action, such as by re-sending the lost message, diagnosing the error, and/or taking other action, like shutting down the faulty system. The completion timeout logic may also communicate a message with the tag retire control register.

This communication may program the register to make the corresponding tags unavailable or temporarily unavailable for reuse. The register may be a bit vector or other suitable device for selectively disabling the tags available within the scoreboard. The unavailable tags, as described above, may be made available with the restore tags register re-setting the scoreboard. The CPU may communicate read and write commands to both of the register in order to program them in the describe manner.

The registers may be writeable, or at least settable, with hardware and writeable, or at least clearable, with software. This can be helpful in allowing the PCIe process to execute as they normally would without having to be adjusted to prevent the tag reuse contemplated by the present invention. The registers can be used, for example, to override the scoreboard to prevent or allow usage of the tags, independently of how the completion timeout detect logic communicates with the scoreboard.

PCIe or other processes, as described above, may automatically allow tags to be reused after a particular period of time. This may be done with communications between the timeout detect logic and the scoreboard. The register may be configured to override these communications so as to prevent the scoreboard from implementing the instructions from the timeout detect logic. This may be particularly advantageous with the present invention if the present invention is implemented through privileged software or other mechanisms that operation between/independently of the operating system directing the PCIe processes and the hardware executing the PCIe processes.

While the present invention is predominately described with respect to PCIe, the present invention is not intended to be limited to PCIe. The present invention fully contemplates its application to any request-response messaging system, particularly systems where elements process the wrong response as if it were the right response. These other response-request messaging systems may include those that rely on timeout-based tag reuse or other tag reuse strategies having susceptibilities to ghost completion/silent data corruption errors.

As supported above, one non-limiting aspect of the present invention relates to a feature to minimize probability of silent data corruption (SDC) due to a PCI-Express (PCIe) "ghost completion" (GC) in a computer system's PCIe I/O subsystem. A GC is intended to at least include a PCIe Completion Transaction Layer Packet (TLP) which arrives at the Requester (RQ) after the completion timeout (CTO) for that transaction has occurred and the tag for that transaction has been re-allocated to a new transaction. The present invention combats the problem of the RQ erroneously associating the GC with a new transaction.

The RQ may maintain a pool of N transaction tags and use an algorithm to assign an available (unused) tag to a new non-posted request. The RQ may implement a timer for each tag, with a timeout duration programmed according to the PCIe spec. The timer can start when the request is sent and can stop when the Completion TLP with the tag matching that of the request is received. The timeout duration can be programmed conservatively so that it exceeds worst-case turn-around time from request to completion. Due to fabric congestion and/or fabric or responder hardware (HW) faults, the delay can at times exceed the timeout duration. Fabric congestion delays increase and become increasingly unpredictable as the level of switches in the path between RQ and Responder increases. Furthermore, in a bringup environment where software (SW) is being tuned, timeouts may initially not be programmed high enough.

A GC is a properly formatted TLP processed as normal with no indication of any problem to software (SW). If a given tag had already been re-used for another transaction by the time the ghost completion having that tag value arrived, the RQ would, without the safeguard described by the present invention, return the wrong data in the case of a read, or prematurely acknowledge transaction completion. The consequences of using the wrong data for a read can be severe. SDC can be extremely difficult to diagnose and isolate. For the case of a non-posted write acknowledged prematurely, the consequences can also be severe and can lead to SDC: for example, if SW uses the acknowledgement to trigger a read to the same device.

To guard against this possibility of a ghost completion causing SDC, the present invention describes a scheme whereby HW in the RQ removes a tag from the pool of transaction tags after there is a CTO for that tag. Removing the tag from the pool means the tag cannot be used for any future transactions until SW takes corrective action. HW keeps removing tags in this way until there is a certain number of tags left in the pool (e.g. ¼ pool size); that number can be programmed in a register implemented in the RQ. If a CTO occurs, and the number of tags left in the pool is less than or equal to the threshold, the tag can stay in the pool. This prevents HW from fully depleting tags, which could cause a system failure and prevent diagnosis because no tags would be available to perform device error log register reads.

SW can return tags to the pool by writing to a separate register implemented in the RQ. This register is in the form of a bit vector, with one bit per tag. HW sets a given bit to 1 if that corresponding tag suffered a CTO. When SW writes to the register, all bits which are set are cleared, meaning those tags are available for use again. In most systems, the error handling can be configured such that a CTO on PCIe generates an interrupt to the host. Upon receiving this interrupt, the SW driver, depending on the particular system implementation, may read registers in the RQ or in other devices on the PCIe fabric to attempt to diagnose the cause of the error. In more sophisticated systems that require very high availability rates, SW can even recover by selectively shutting down faulty devices and removing them from the fabric. A typical usage model for this feature would be for SW to reset the subsystem after shutting down the device(s) responsible for the timeouts.

The present invention may be to a PCIe Root Complex, i.e., the device that sits at the root of the PCIe tree closest to the host CPU. It could, however, be implemented at a PCIe endpoint device as well. The reason it may be less effective in an endpoint device is that if software needs to write or read registers associated with this feature to control it in the endpoint device, the hardware fault and/or congestion in the fabric between the Root Complex and the endpoint device (i.e. congestion that caused the CTO itself) may prevent such writes or reads from succeeding. Wherever it is implemented, the feature may have relatively small complexity and gate count, and should greatly reduce system vulnerability to silent data corruption. The software support for the feature is also minimal and works within the existing framework for PCI-Express device drivers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A root complex for use in a request-response messaging system, the root complex comprising:
    a processor interface for communicating with a central processing unit;
    a network interface for communicating with a transmission medium;
    a scoreboard configured to maintain status information for a pool of tags;
    an assignment element configured to include one of the available tags with each outgoing request message;
    a message receiving element configured to match response messages with request messages based on the tag;
    a completion timeout detection element configured to identify request messages that have been outstanding for an excessive period of time and to manipulate the status information on the scoreboard to prevent the corresponding tag from being reused; and
    a tag restoration element configured to manipulate status information on the scoreboard to make tags available for reuse if the number of tags available decreases below a threshold.

2. The root complex of claim 1 further comprising a register configured to permit fault management software executed on the central processing unit to manipulate status information on the scoreboard.

3. A method of avoiding silent data corruption in an automated request-response messaging system having a finite pool of tags, the method comprising:
    associating tags with request messages accepted from a central processing unit;
    issuing the request messages with the associated tags into a transmission medium;
    receiving response messages containing tags;
    identifying tags associated with timed-out request messages when a threshold period of time elapses without receiving a response message containing the tag;
    maintaining a list of tags associated with timed-out request messages;
    preventing the assignment of tags in the list to request messages; and
    removing a tag from the list in response to the number of tags in the list increasing above a threshold number.

4. The method of claim 3 further comprising informing the central processing unit when a tag is placed in the list.

5. The method of claim 3 further comprising forwarding response messages to the central processing unit if the response message contains a tag that is not in the list.

6. The method of claim 3 further comprising continuously maintaining the size of the list below the threshold number.

7. The method of claim 3 wherein the threshold number is dynamically adjusted by the central processing unit.

8. The method of claim 3 wherein tags are removed from the list on a first-in-first-out basis.

9. The method of claim 3 further comprising
removing a tag from the list; and
re-issuing the message associated with the tag.

10. The method of claim 3 wherein the threshold time period is longer for more critical request messages.

11. The method of claim 3 wherein the threshold time period is longer for request message types or lengths having historically longer response times.

12. The method of claim 3 wherein the transmission medium is a PCIe fabric.

13. The method of claim 12 wherein the threshold time period is based on current congestion of the fabric.

14. The method of claim 3 further comprising manipulating entries on a scoreboard wherein the scoreboard contains an entry for each tag in the pool of tags.

15. The method of claim 14 further comprising setting an entry on the scoreboard to prevent re-use of a tag upon expiration of the threshold time period.

16. The method of claim 14 further comprising manipulating entries on the scoreboard to allow re-use of a tag in response to the central processing unit setting a register.

17. A root complex for a request-response messaging system having a pool of tags, the root complex configured to:
associate tags with request messages accepted from a central processing unit;
issue the request messages into a transmission medium;
receive response messages containing tags;
forward response messages to the central processing unit;
identify timed-out request messages when a threshold period of time elapses without receiving a corresponding response message;
maintain a list of tags associated with timed-out request messages; and
prevent the assignment of tags in the list to request messages; and
remove a tag from the list in response to the number of tags in the list increasing above a threshold number.

18. The root complex of claim 17 wherein the transmission medium is a PCIe fabric.

* * * * *

UNITED STATES PATENT AND TRADEMARK OFFICE
CERTIFICATE OF CORRECTION

PATENT NO.         : 8,839,268 B2                                    Page 1 of 1
APPLICATION NO.    : 12/027549
DATED              : September 16, 2014
INVENTOR(S)        : Feehrer It is certified that error appears in the above-identified patent and that said Letters Patent is hereby corrected as shown below:

In the Specification

In column 4, line 9, delete "its" and insert -- it --, therefor.

Signed and Sealed this
Seventeenth Day of March, 2015

Michelle K. Lee
*Director of the United States Patent and Trademark Office*